United States Patent
Holland

[11] 3,774,942
[45] Nov. 27, 1973

[54] ROCKING BOLSTER
[75] Inventor: John H. Holland, Norman, Okla.
[73] Assignee: Arkansas Rock and Gravel Co., Mufreesboro, Ark.
[22] Filed: Oct. 7, 1971
[21] Appl. No.: 187,456

[52] U.S. Cl. .............................. 280/440, 308/166
[51] Int. Cl. ............................................ B62d 53/08
[58] Field of Search ................... 280/438, 439, 440; 308/166

[56] References Cited
UNITED STATES PATENTS

| | | | |
|---|---|---|---|
| 1,538,573 | 5/1925 | Minney | 308/166 |
| 1,839,497 | 1/1932 | Peterson | 308/166 |
| 2,359,499 | 10/1944 | Walther | 280/439 |
| 2,564,307 | 8/1951 | Keiser | 308/166 |
| 2,923,560 | 2/1960 | Anderson | 280/440 |
| 3,208,770 | 9/1965 | Freitas | 280/440 |
| 3,430,987 | 4/1969 | Whitmire | 280/438 R |

Primary Examiner—Leo Friaglia
Assistant Examiner—Randall Schrecengost
Attorney—Richards, Harris & Hubbard

[57] ABSTRACT

A rocking bolster includes a first box frame which is fixedly supported in the front end of a semitrailer and a second box frame which is supported in the first box frame for pivotal movement about an axis extending longitudinally of the semitrailer. A kingpin depends from the second box frame for cooperation with a contact plate on a tractor to connect the semitrailer to the tractor, and a plurality of resilient members are supported on the second box frame for compressive engagement with the first box frame upon relative pivotal movement between the box frames. The resilient members permit sufficient pivotal movement of the semitrailer about the longitudinal axis to prevent undue stress loads on the trailer and to prevent excessive tipping of the trailer, and at the same time provide sufficient rigidity to prevent buckling of the rocking bolster and the contact plate when the tractor is operated to turn the semictrailer around.

6 Claims, 7 Drawing Figures

INVENTOR:
JOHN H. HOLLAND

Richards, Harris & Hubbard
ATTORNEYS

INVENTOR:
JOHN H. HOLLAND

ROCKING BOLSTER

BACKGROUND AND SUMMARY OF THE INVENTION

This invention relates to a rocking bolster for semitrailers, and more particularly to a bolster which functions to stabilize a semitrailer against undesirable pivotal movements.

As is well known, semitrailers are almost always connected to tractors by means of fifth wheels. Such devices typically comprise a semitrailer contact plate supported on a tractor for pivotal movement about an axis extending transversely of the tractor and a kingpin which depends from the front end of a semitrailer for cooperation with the contact plate to connect the semitrailer to the tractor. In most instances the kingpin is connected directly to the chassis of the semitrailer. However, in the case of vehicles intended for off-the-road usage and in other situations in which the semitrailer might become skewed relative to the tractor, it has been found to be desirable to equip the semitrailer with structure that permits relative pivotal movement between the semitrailer and the kingpin about an axis extending longitudinally of the trailer. The latter structure is referred to as a rocking bolster and functions both to prevent the application of excessive stress loads to the trailer and to prevent excessive tipping of the trailer that might otherwise be encountered during off-the-road use of the semitrailer.

Although generally satisfactory, rocking bolsters have heretofore exhibited one very serious deficiency. When the tractor is operated to turn the semitrailer around, it is necessary to turn the tractor relative to the semitrailer until it is oriented approximately perpendicularly with respect thereto. At this point the axis of pivotal movement of the rocking bolster extends parallel to the axis of pivotal movement of the semitrailer contact plate. This creates an unstable situation in that the contact plate and the rocking bolster can buckle, whereby the front end of the semitrailer is dropped downwardly relative to the tractor. Then, as the tractor is returned to its normal orientation relative to the semitrailer, the semitrailer must be restored to its original position by a camming action between the contact plate and the rocking bolster. This imposes an undue load on the bearings which support the contact plate and the rocking bolster and thereby greatly accelerates bearing wear and related deterioration of the component parts of the contact plate and the rocking bolster.

The present invention comprises a novel rocking bolster for semitrailers which overcomes the foregoing and other disadvantages that are characteristic of the prior art. In accordance with the preferred embodiment of the invention, a rocking bolster comprises a first member secured to a semitrailer and a second member supported for pivotal movement relative to the first member about an axis extending longitudinally of the semitrailer. A kingpin depends from the second member for connection to the semitrailer contact plate of a tractor. At least one resilient member is supported for actuation upon relative pivotal movement between the first and second members. By this means the rocking bolster and the contact plate are prevented from buckling, and the semitrailer is therefore prevented from falling relative to the tractor when the tractor is oriented perpendicularly to the semitrailer. At the same time the resilient member permits sufficient pivotal movement of the semitrailer about the longitudinal axis to prevent both excessive stress loads on and excessive tipping of the trailer during off-the-road usage.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
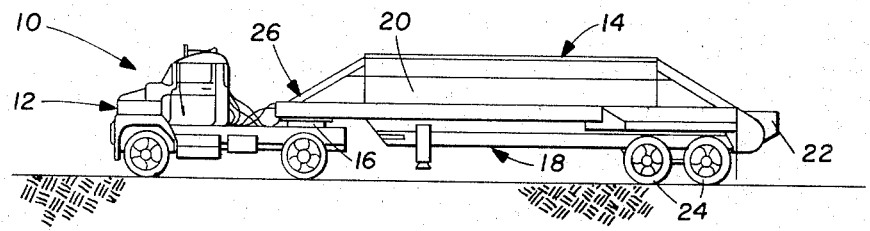
FIG. 1 is a side view of the vehicle incorporating a rocking bolster constructed in accordance with the preferred embodiment of the invention.

Referring now to the Drawings and particularly to FIG. 1, there is shown a vehicle 10 comprising a tractor 12 and a semitrailer 14. The tractor 12 is conventional and includes a semitrailer contact plate 16 supported for pivotal movement upon an axis extending transversely of the tractor 12. The semitrailer 14 includes a chassis 18 comprising an open topped material receiving hopper 20. A conveyor (not shown) is mounted in the lower portion of the trailer 14 for operation to transport material out of the hopper 20 through a chute 22 at the rear of the semitrailer. The rear portion of the chassis 18 of the semitrailer 14 is supported on a plurality of wheels 24, and a rocking bolster 26 comprising the preferred embodiment of the invention is mounted in the forward portion of the chassis 18 for cooperation with the semitrailer contact plate 16 of the tractor 12 to interconnect the semitrailer 14 and the tractor 12 comprising the vehicle 10. A more detailed understanding of the construction and operation of the semitrailer 14 may be had by referring to the co-pending U.S. Pat. applications of John H. Holland, Ser. No. 852,345, filed Aug. 22, 1969, now U.S. Pat. No. 3,647,096, and Ser. No. 97,801, filed Dec. 14, 1970, both of which are assigned to the assignee of the present application.

Figure 3:
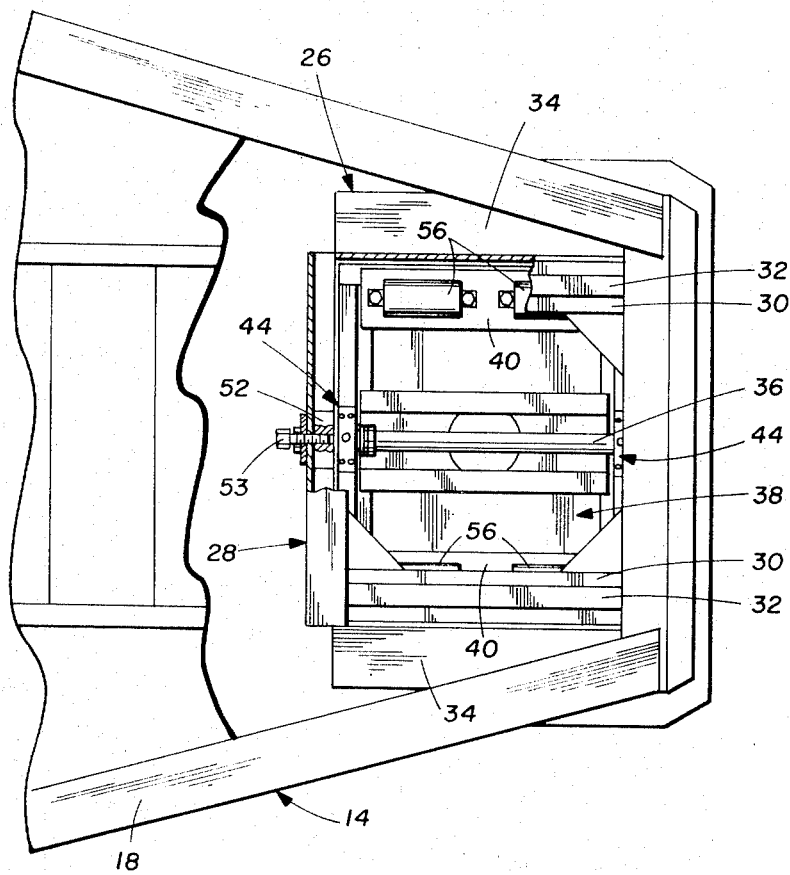
FIG. 3 is a top view of the rocking bolster of the vehicle shown in FIG. 1.
Figure 4:
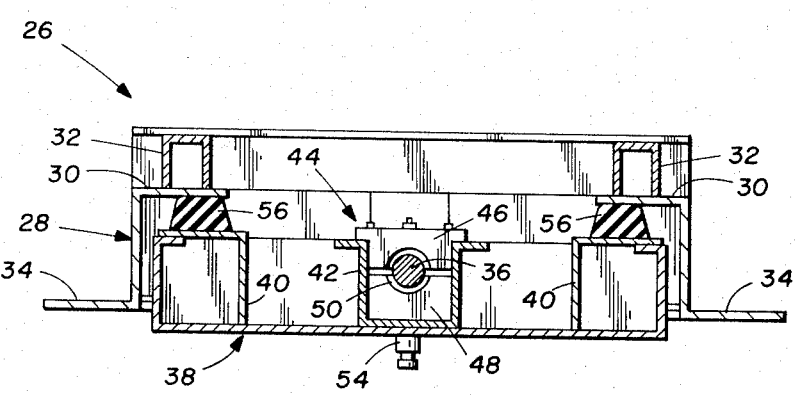
FIG. 4 is a transverse sectional view of the rocking bolster.

Referring now to FIGS. 3 and 4, the rocking bolster 26 of the vehicle 10 includes a first box frame 28 which is fixedly secured in the chassis 18 of the semitrailer 14. The first box frame 28 is rectangular in shape and includes a pair of inwardly extending flanges 30 which are reinforced by a pair of channel members 32. The box frame 28 also includes a pair of outwardly extending flanges 34 which are employed to secure the box frame 28 to the chassis 18 of the trailer 14. A shaft 36 is secured in the box frame 28 by suitable means, such as welding. The shaft 36 extends parallel to the longitudinal axis of the trailer 14 of the vehicle 10.

A second box frame 38 is mounted within the first box frame 28. The second box frame 38 is rectangular in shape and includes a pair of rectangular sections 40 which extend beneath the flanges 30 of the box frame 28. A channel 42 is mounted in the central portion of the box frame 38. The box frame 28 is rotatably supported on the shaft 36 by two sets of bearing blocks 44 each including an upper bearing block 46 and a lower bearing block 48. Conventional brass bushings 50 are secured between the bearing blocks 46 and 48 of each set 44 and engage the shaft 36. As best shown in FIG. 2, at least one thrust washer 52 is mounted on the shaft 36 and is positioned between the first box frame 28 and the second box frame 38 to transfer thrust loads from the tractor 12 to the chassis 18 of the semi-trailer 14. An adjustment screw 53 is provided for use in taking up the thrust washer 52 to compensate for wear. A kingpin 54 depends from the second box frame 38 of the rocking bolster for cooperation with the semitrailer contact plate 16 of the tractor 12 to interconnect the semitrailer 14 and the tractor 12 of the vehicle 10.

From the foregoing it will be apparent that the second box frame 38 of the rocking bolster 26 is supported for pivotal movement relative to the first box frame 28 about the axis of the shaft 36. By this means the rocking bolster functions in the manner of a conventional rocking bolster to permit pivotal movement of the semitrailer 14 of the vehicle 10 about a longitudinal axis. This prevents the application of excessive stress loads to the trailer and also tends to reduce tipping of the semitrailer.

The rocking bolster 26 further includes four resilient members 56 which are mounted on the rectangular sections 40 of the second box frame 38 for engagement with the inwardly directed flanges 30 of the first box frame 38. The resilient members 56 are preferably formed from a suitable elastomeric material, such as neoprene. The resilient members 56 function to limit pivotal movement of the second box frame 38 about the axis of the shaft 36 and thereby function to stabilize the trailer 14 of the vehicle 10 against excessive pivotal movements relative to the tractor 12 of the vehicle.

The function of the rocking bolster 26 of the vehicle 10 will be better understood by referring to FIGS. 1 and 2A through 2D. The tractor 12 and the semitrailer 14 of the vehicle 10 are normally oriented in the manner shown in FIGS. 1 and 2A. At such times, the mounting of the contact plate 16 for pivotal movement about an axis extending transversely of the tractor 12 and the mounting of the kingpin 54 on the second box frame 38 of the rocking bolster 26 for pivotal movement about an axis extending longitudinally of the semitrailer 14 permits relative pivotal movement between the tractor 12 and the semitrailer 14 about mutually perpendicular axes. By this means the vehicle 10 is adapted to off-the-road usage in that the vehicle 10 can be manipulated into and out of ruts and over obstructions of various kinds without encountering difficulties of any sort.

Figure 2A:
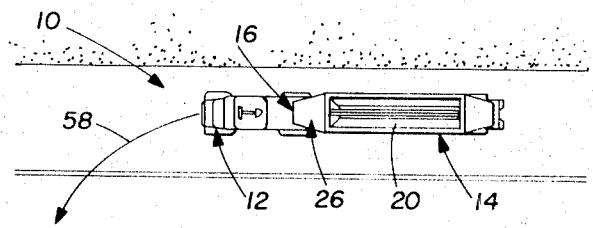
FIGS. 2A, 2B, 2C, and 2D are illustrations of progressive steps in turning the vehicle around.
Figure 2B:
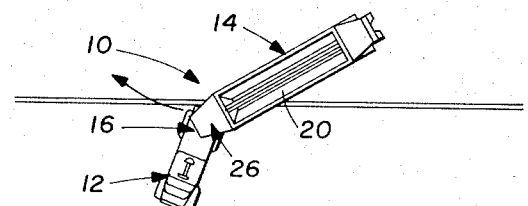
Figure 2C:
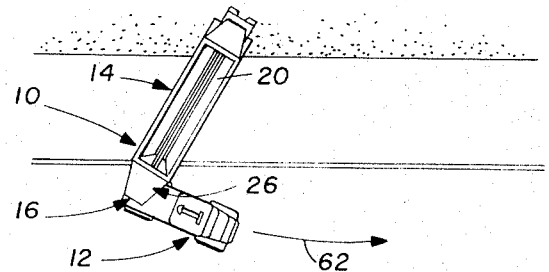
Figure 2D:
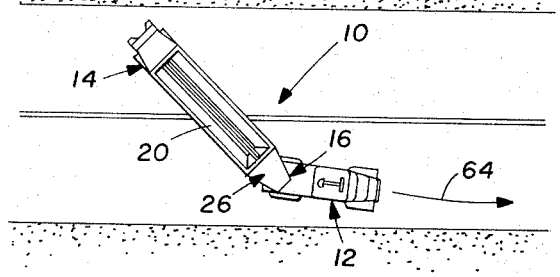

The manipulation of the vehicle 10 in turning around is illustrated in FIGS. 2A through 2D. The tractor 12 is initially operated to move its front end in the direction of the arrow 58 shown in FIG. 2A. This action is continued until the tractor 12 and the semitrailer 14 are positioned as shown in FIG. 2B. Then, the tractor 12 is operated to move the front end of the trailer and the rear end of the tractor in the direction of the arrow 60 shown in FIG. 2B. This action is continued until the tractor and the trailer are oriented as shown in FIG. 2C. At this point the tractor 12 is operated to move its own front end in the direction of the arrow 62 shown in FIG. 2C. This action manipulates the tractor and the trailer into the position shown in FIG. 2D, whereupon the tractor is operated to drive the vehicle 10 in the opposite direction as indicated by the arrow 64.

Referring particularly to FIG. 2C, it will be understood that when the tractor is oriented perpendicularly to the semitrailer 14, the axis of pivotal movement of the contact plate 16 of the trailer 14 extends parallel to the axis of pivotal movement of the box frame 38 of the rocking bolster 26. If it were not for the utilization of the resilient members 56 in the rocking bolster 26, this condition would be unstable in that the semitrailer contact plate 16 and the second box frame 38 could buckle. Were such buckling to occur, the front end of the trailer 14 would be displaced downwardly relative to the rear end of the tractor 12. This would be highly undesirable in that the component parts of the contact plate 16 and the rocking bolster 26 would then have to cam the front end of the semitrailer upwardly as the tractor 12 is returned to its normal orientation relative to the trailer 14. It will be appreciated that such camming action would impose undue stress loads on the component parts of the contact plate 16 and the rocking bolster 26, whereby the contact plate and the rocking bolster would be subject to rapid deterioration and failure.

It has been found that when the rocking bolster 26 is equipped with the resilient members 56, the foregoing detrimental action does not occur. Instead, the resilient members 56 function to prevent excessive pivotal motion of the second box frame 36 relative to the first box frame 28 and thereby prevent the rocking bolster 26 and the contact plate 16 from buckling when the tractor 12 is oriented perpendicularly relative to the semitrailer 14. This in turn prevents the trailer 14 from falling relative to the tractor 12 so that camming of the front end of the trailer upwardly as the tractor is returned to its normal orientation relative to the trailer is unnecessary.

By preventing buckling of the rocking bolster and the semitrailer contact plate, the use of the present invention results in a marked reduction in wear of the component parts of the rocking bolster and the contact plate. At the same time, the resilient members of a rocking bolster incorporating the invention permit sufficient pivotal movement of a semitrailer to prevent undue stress loads on the trailer and to prevent excessive tipping of the trailer that might otherwise occur during off-the-road usage, etc.

It will be appreciated that the rocking bolster 26 illustrated in the Drawings is readily adapted to various alternative design configurations. Perhaps the most readily apparent variation to the structure shown would be to mount the resilient member 56 on the flanges 30 of the first box frame 28 for engagement with the rectangular sections 40 of the second box frame 38. Another variation would be to provide a single resilient member mounted for compressive actuation in response to pivotal motion of the second box frame 38 in either direction relative to the axis of the shaft. Other variations to the design shown in the Drawings will readily suggest themselves to those skilled in the art.

From the foregoing it will be understood that in accordance with the present invention, a vehicle comprising a tractor and a semitrailer is provided with a rocking bolster including a member supported on the semitrailer for pivotal movement about an axis extending longitudinally of the semi-trailer. The pivotally supported member is equipped with structure for connecting the semitrailer to the tractor, and at least one resilient member is mounted for compressive actuation in response to pivotal movement of the pivotally supported member relative to the semitrailer. By this means the semitrailer and the tractor are connected in such a way that the vehicle may be operated off-the-road, etc., without imposing excessive stress on the structure of the semitrailer and without danger of excessive tipping. At the same time, relative pivotal motion between the semitrailer and the tractor are controlled whereby the semitrailer is stabilized as the vehicle is turned around and through other manipulations during which the tractor is oriented perpendicularly to the semitrailer.

Although the preferred embodiment of the invention has been illustrated in the Drawings and described in the foregoing Detailed Description, it will be understood that the invention is not limited to the embodiment disclosed, but is capable of numerous rearrangements, modifications, and substitutions of parts and elements without departing from the spirit of the invention.

What is claimed is:

1. A rocking bolster comprising:

upper box frame means adapted to be fixedly secured to the chassis of a semitrailer and including a pair of spaced apart longitudinally extending box beams;

lower box frame means mounted within the upper box frame means and comprising a pair of spaced apart longitudinally extending box beams each aligned with one of the box beams of the upper box frame means;

king pin means depending from the lower box frame means for cooperation with the semitrailer contact plate of a tractor to couple the semitrailer to the tractor;

an upwardly facing, longitudinally extending channel member mounted in the lower box frame means midway between the box beams thereof and directly above the king pin means;

a longitudinally extending shaft fixedly mounted in the upper box frame means and extending through the channel;

a pair of bearing block assemblies mounted on the lower box frame means at the opposite ends of the channel for cooperation with the shaft to pivotally support the lower box frame means on the upper box frame means;

a pair of elastomeric members each secured to one of the box beams of one of the box frame means and engaging the aligned box beam of the other box frame means for restraining relative pivotal movement between the upper and lower box frame means and thereby preventing buckling of the rocking bolster and the semitrailer contact plate when the tractor is oriented substantially perpendicularly to the semitrailer; and thrust washer means mounted between the upper and lower box frame means.

2. The rocking bolster according to claim 1 wherein the bearing block assemblies each comprise opposed upper and lower bearing blocks and replaceable bushings secured between the bearing blocks and engaging the shaft.

3. The rocking bolster according to claim 1 wherein the thrust washer means is adjustable to compensate for wear.

4. A semitrailer vehicle comprising:

a chassis;

wheel means for supporting the rear end of the chassis;

upper box frame means secured to the front end of the chassis and including spaced apart longitudinally extending box beams;

lower box frame means mounted within the upper box frame means and including spaced apart box beams aligned with the box beams of the upper box frame means;

thrust washer means disposed between the upper and lower box frame means;

a longitudinally extending shaft mounted in the upper box frame means;

a pair of longitudinally spaced apart bearing assemblies mounted in the lower box frame means for receiving the shaft and thereby supporting the lower box frame means for pivotal movement relative to the upper box frame means;

a pair of resilient members each mounted on one of the box beams of one of the box frame means and engaging the aligned box beam of the other box frame means for restraining relative pivotal movement between the box frame means; and king pin means depending from the lower box frame means for connecting the semitrailer to a tractor.

5. The semitrailer vehicle according to claim 4 wherein the bearing assemblies each comprise replaceable bushing members engaging the shaft and wherein the thrust washer means is adjustable to take up slack between the upper and lower box frame means.

6. A vehicle comprising:

a tractor including a semitrailer contact plate supported for pivotal movement about a transversely extending axis;

a semitrailer including a chassis and wheel means for supporting the rear end of the chassis; and a rocking bolster for interconnecting the front end of the chassis of the semitrailer and the semitrailer contact plate of the tractor and for accommodating pivotal movement of the chassis of the semitrailer relative to the tractor which comprises:

upper box frame means secured to the chassis of the semitrailer and including opposed longitudinally extending box beams;

a longitudinally extending shaft fixedly mounted in the upper box frame means;

lower box frame means including opposed longitudinally extending box beams positioned in alignment with the box beams of the upper box frame means;

an upwardly facing, longitudinally extending channel member mounted on the lower box frame means midway between the box frames thereof;

a pair of bearing block means mounted on the lower box frame at the opposite ends of the channel and including replaceable bushing means for receiving the shaft and thereby pivotally supporting the lower box frame means on the upper box frame means;

a pair of resilient members mounted between the aligned box frames of the upper and lower box beams for limiting relative pivotal movement between the lower box frame means and the upper box frame means and thereby preventing buckling of the rocking bolster and the semitrailer contact plate when the tractor is oriented substantially perpendicularly to the semitrailer; and thrust washer means mounted between the upper and lower box frame means for controlling the longitudinal positioning of the lower box frame means relative to the upper box frame means and including adjustment means for taking up slack between the box frame means.

\* \* \* \* \*